United States Patent [19]
Kawaguchi

[11] Patent Number: 5,719,724
[45] Date of Patent: Feb. 17, 1998

[54] ROTARY HEAD APPARATUS FOR RECORDING AND/OR REPRODUCING AN INFORMATION TRACK TO/FROM A MAGNETIC TAPE HAVING PREDETERMINED ORIENTATION CHARACTERISTICS TO PREVENT UNBALANCE OF PERFORMANCE BETWEEN THE CHANNEL

[75] Inventor: Moriyuki Kawaguchi, Tokyo, Japan

[73] Assignee: Sony Corporation, Tokyo, Japan

[21] Appl. No.: 708,322

[22] Filed: Sep. 5, 1996

[30] Foreign Application Priority Data

Sep. 7, 1995 [JP] Japan ................................. 7-255519

[51] Int. Cl.$^6$ ............................................. G11B 5/027
[52] U.S. Cl. ......................................................... 360/84
[58] Field of Search .............................. 360/65, 81–85, 360/121, 107

[56] References Cited

U.S. PATENT DOCUMENTS

5,193,045 3/1993 Kochi ........................................ 360/84

*Primary Examiner*—A. J. Heinz
*Attorney, Agent, or Firm*—William S. Frommer; Alvin Sinderbrand

[57] ABSTRACT

A rotary head apparatus for recording and/or reproducing an information track to/from a magnetic tape having predetermined orientation characteristics is constructed by: a first magnetic head having a first azimuth angle; a second magnetic head which has a second azimuth angle whose performance is relatively inferior to that of the first magnetic head and forms or reproduces the information track of a width larger than that of the first magnetic head; and a rotating member for rotating the first and second magnetic heads. The angle of the second azimuth angle for the orientation direction of the tape is larger than that of the first azimuth angle.

12 Claims, 9 Drawing Sheets

THE NUMBER OF BLOCKS OF 1 FRAME IN CASE OF 525/60 SYSTEM

ROTARY HEAD APPARATUS FOR RECORDING AND/OR REPRODUCING AN INFORMATION TRACK TO/FROM A MAGNETIC TAPE HAVING PREDETERMINED ORIENTATION CHARACTERISTICS TO PREVENT UNBALANCE OF PERFORMANCE BETWEEN THE CHANNEL

BACKGROUND OF THE INVENTION

1. Field of the Invention

The present invention relates to a rotary head apparatus for recording/reproducing information signal for use in a VTR of a helical scan type.

2. Description of the Related Art

In a conventional helical scan type magnetic recording apparatus, for example, a VCR (Video Cassette Recorder) for recording/reproducing a video signal, a head of an A channel and a head of a B channel are attached to a rotary drum rotating at a frame frequency at opposite positions where the heads face each other at an angle of 180°. A magnetic tape is obliquely wrapped around a peripheral surface of the rotary drum, for instance, at an angle near 180°. The pair of heads are alternately come into contact with the magnetic tape and oblique tracks are sequentially formed on the magnetic tape. An angle of the track for the longitudinal direction of the magnetic tape is called a track angle and is usually set to about 5°. A video signal (including a frequency modulated luminance signal and a chrominance signal converted to a low band carrier frequency) and a frequency modulated audio signal of one field are recorded in each track.

In the VCR, a guard band in which no signal is recorded is not provided between the tracks so that an amount of tape which is consumed can be reduced or a long time recording can be performed, so that a crosstalk between the adjacent tracks becomes a problem. With respect to the frequency modulated luminance signal, it is known that the crosstalk is suppressed by an azimuth loss. That is, when an angle of a gap of the head for the normal line of the track direction (head scanning direction) is defined as an azimuth angle, the azimuth angles of the heads for forming the adjacent tracks are almost equal and have opposite polarities ($\alpha$ and $-\alpha$, $\alpha \geq 0$). For example, the azimuth angles are set to $\pm 10°$ in an 8 mm VCR.

As a magnetic tape which is used in such a VCR, a coating type tape such that a binder in which ferromagnetic particles have uniformly been distributed is coated on a base and an evaporation deposition tape such that a ferromagnetic metal is evaporated and deposited on a base in a vacuum are known. In the coating type tape, an orienting process to align the major axis direction of the magnetic particles in the tape longitudinal direction is performed to increase a filling degree of the magnetic particles in a manufacturing process. The evaporation deposition tape has a strong magnetic anisotropy in the tape longitudinal direction in view of its structure.

As mentioned above, although the magnetic tape has the magnetic anisotropy in the longitudinal direction, the track angle is small in the conventional VCR and the track direction and the tape orienting direction almost coincide, so that no problem occurs due to the difference. The small track angle, however, means that the track is long and it is a disadvantage from a viewpoint of linearity of the track, so that it is consequently disturbed to narrow the width of the track. It is, therefore, preferable to set the track angle to a large value such as 10° and to reduce the length of track. When the track is short, it is necessary to divisionally record information of one field to a plurality of tracks. When a digital video signal is recorded, a signal process of the divisional recording is easy.

When the track angle is set to a large value as mentioned above, a difference between the orienting direction of the magnetic tape and the track direction causes unbalance of reproduction outputs of the two heads. The unbalance is more conspicuous in the evaporation deposition tape in which the orientation is stronger.

This is because when a track pattern is recorded on a tape with a track angle $\theta$ in the rotary head apparatus in which the head of the A channel and the head of the B channel respectively have the azimuth angles ($\alpha$ and $-\alpha$, $\alpha \geq 0$) of the same value and the opposite polarities, inclinations of the recording magnetization (each of which coincides with the normal line of the gap of each head) for the tape longitudinal direction, namely, the orienting direction are asymmetrical, namely, are equal to $\theta+\alpha$ and $\theta-\alpha$ with respect to the A channel and B channel.

Figure 1:
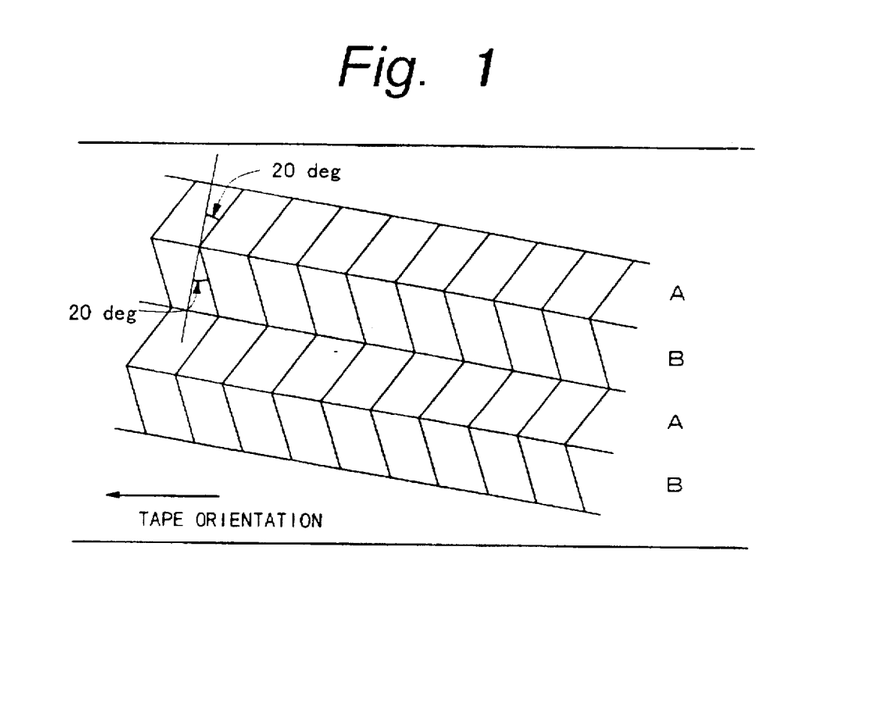
FIG. 1 is a schematic diagram showing the relation among track angles, azimuth angles, and an orienting direction of a tape.
Figure 1A:
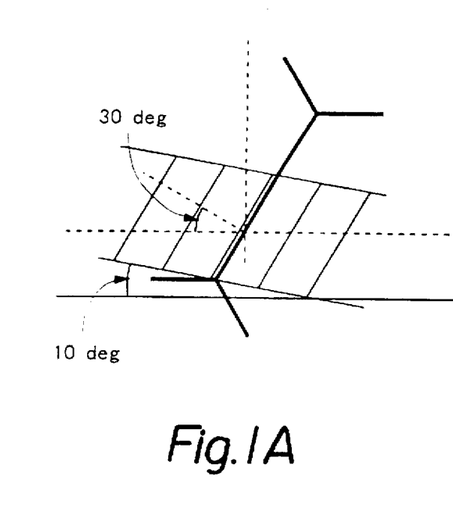
FIG. 1A is a schematic diagram showing the relation between a track angle of +10°, an azimuth angle of +20°, thereby resulting in a +30° orientation of the tape.
Figure 1B:
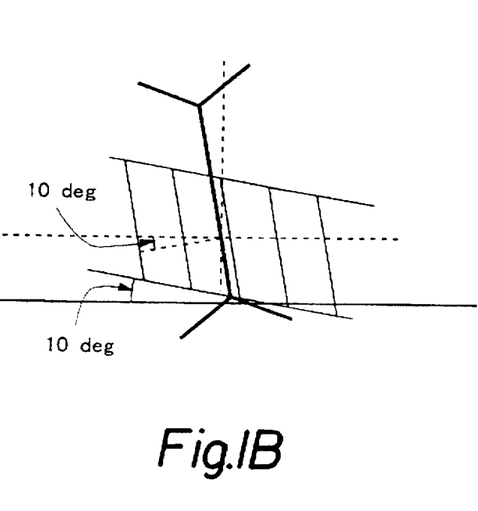
FIG. 1B is a schematic diagram showing the relation between a track angle of +10°, an azimuth angle of −20°, thereby resulting in a −10° orientation of the tape.

A reproduction output is almost proportional to cos of an angle between the direction of the recording magnetization and the orienting direction. For example, as shown in FIG. 1, when the azimuth angles are set to $\pm 20°$ and the track angle is set to 10°, A channel: reproduction output $\propto \cos(20+10) = 0.866$ B channel: reproduction output $\propto \cos(20-10) = 0.985$ Even if the original outputs are equal, an output difference of about 1.1 times (1.1 dB) occurs between both channels.

Further, the asymmetry of the angles between the direction of the recording magnetization and the orienting direction of the two channels also exerts an influence on the adjacent crosstalk. That is, with respect to the A channel, although an output of the main track is low, since an output of the B channel as an adjacent track is high, the level of the adjacent crosstalk is relatively high. On the contrary, with respect to the B channel, since the output of the main track is high and the output of the adjacent track is low, the level of the adjacent crosstalk is relatively low.

In addition, the asymmetry of the angles between the direction of the recording magnetization and the orienting direction between the two channels causes a difference between the two channels also in a phenomenon (adjacent erase phenomenon) such that a part of the recorded track is erased by a leakage magnetic field in the lateral direction from a track edge of the head upon recording. That is, with respect to the A channel, since the angle between the direction (almost coincides with the direction of the ordinary recording magnetic field) of the leakage magnetic field in the lateral direction and the orienting direction is large, a contribution of the adjacent erase magnetic field is small and, consequently, an adjacent erase amount (amount of tracks to be erased in the adjacent B channel) is relatively small. On the contrary, with respect to the B channel, since the angle between the direction of the leakage magnetic field in the lateral direction and the orienting direction is small, an adjacent erase amount (amount of tracks to be erased in the adjacent A channel is relatively large.

When the azimuth angle and the track angle are large as mentioned above, unbalance occurs between the two channels in any point of the reproduction outputs, adjacent crosstalks, and adjacent erase amounts. Especially, like the A channel, the disadvantages by the unbalance such that the reproduction output is small, the adjacent crosstalk is large, and the amount of data to be erased by the adjacent erase is large (that is, the output further decreases) are concentrated to one channel. Thus, an extreme unbalance occurs in the performances of the two channels constructing the rotary head apparatus, it causes a deterioration of performance such as unbalance in the S/N ratio, flickering, and the like in an analog recording apparatus and it causes unbalance in error rates in a digital recording apparatus.

OBJECTS AND SUMMARY OF THE INVENTION

It is, therefore, an object of the invention to provide a rotary head apparatus which can equalize performances of two channels when adjacent tracks are formed onto a magnetic tape in which the orienting direction and the track direction are different by two heads having different azimuth angles.

According to the invention, there is provided a head apparatus for recording and/or reproducing an information track to/from a magnetic tape having predetermined orientation characteristics, comprising: a first magnetic head having a first azimuth angle; a second magnetic head which has a second azimuth angle whose performance is relatively inferior to that of the first magnetic head and forms or reproduces the information track of a width larger than that of the first magnetic head; and a rotating member for rotating the first and second magnetic heads.

Since the widths of the tracks formed by the first and second magnetic heads are set so as to suppress the unbalance in the performances such as reproduction outputs, adjacent crosstalks, adjacent erase, and the like between the two channels which occur from the relation between the azimuth angle and the orienting direction of the tape, the performances of the two channels can be almost equalized.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention will be described hereinbelow with reference to the drawings.

Figure 4:
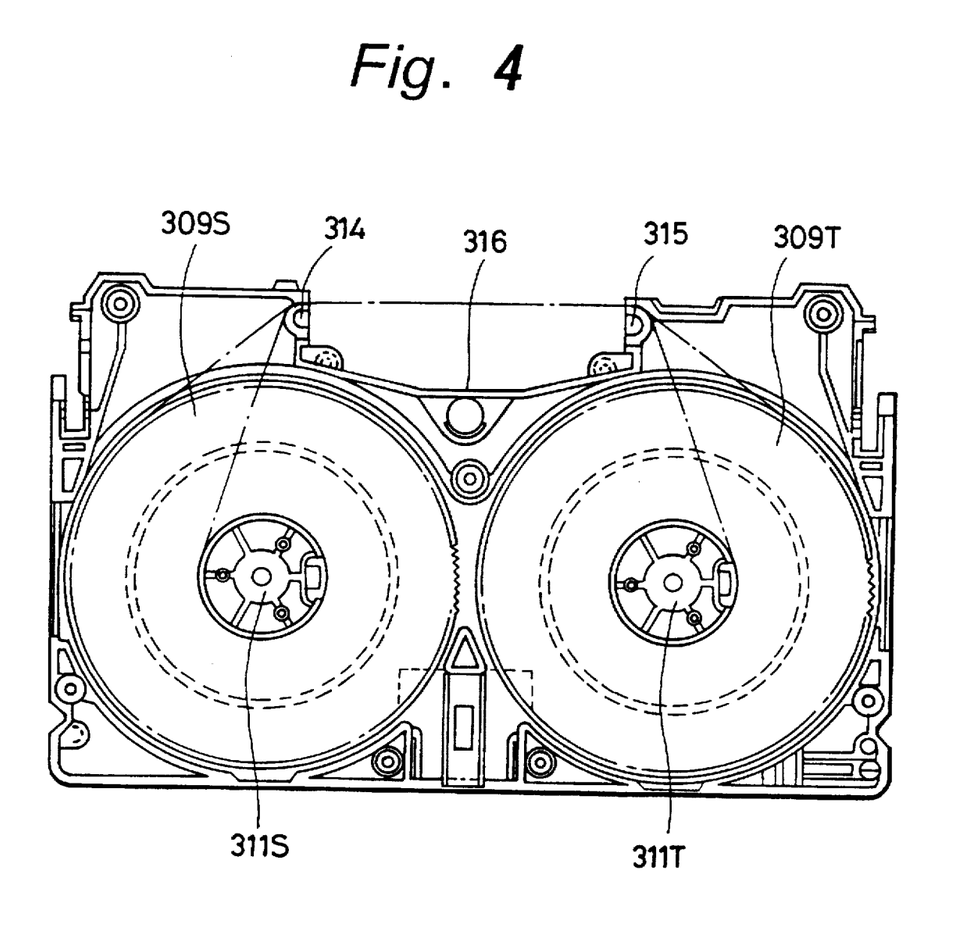
FIG. 4 is a schematic diagram showing a tape cassette to which the invention can be applied.
Figure 5:
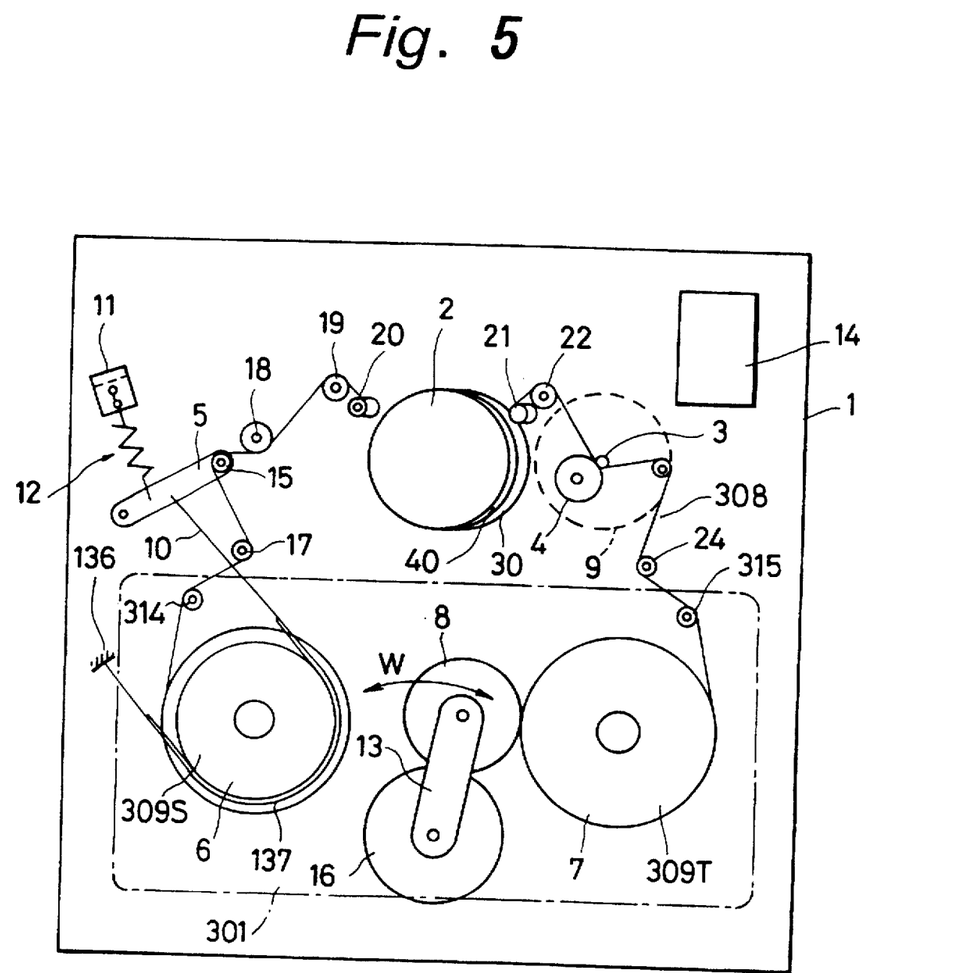
FIG. 5 is a schematic diagram showing a mechanism for recording/reproducing to which the invention can be applied.

FIG. 4 shows a structure of a tape cassette. FIG. 5 shows a structure of a recording and reproducing apparatus.

As shown in FIG. 4, a front face portion of a tape cassette 301 is opened. A magnetic tape 308 which moves between tape reels 309S and 309T faces the outside from the opened front face portion of the tape cassette 301. The front face portion of the cassette 301 can be opened/closed by a lid (not shown) which is rotatably attached to the front side portion of the cassette 301.

A concave portion 316 that is downwardly opened is provided in the front side portion of the cassette 301. The concave portion 316 forms a space on the rear side of the magnetic tape 308 facing the outside on the front face side of the cassette 301.

Fixed guides 314 and 315 are arranged on both sides of the concave portion 316.

As shown in FIG. 5, the recording and reproducing apparatus has a chassis 1 and a recording and reproducing unit is provided on the chassis 1. The recording and reproducing unit serves as a cassette loading portion in which the tape cassette 301 is loaded. The recording and reproducing unit writes or reads an information signal to/from the magnetic tape 308 of the loaded tape cassette 301 and records or reproduces the information signal such as an image signal or the like.

The recording and reproducing unit comprises: a pair of reel bases 6 and 7 which are inserted into and are come into engagement with reel shaft engaging holes 311S and 311T of the tape reels 309S and 309T; a plurality of tape guides for supporting the magnetic tape 308 onto a predetermined run path (tape path); a capstan 3 and a pinch roller 4 serving as a tape feeding mechanism for running the magnetic tape 308; a rotary head unit 2 serving as a recording and reproducing head for transmitting and receiving the information signal to/from the magnetic tape 308; and the like.

In the tape cassette 301 loaded into the recording and receiving unit, while the magnetic tape 308 is fed by the recording and receiving unit, the information signal is recorded or reproduced to/from the magnetic tape 308.

The rotary head unit 2 is arranged on the chassis 1. The rotary head unit 2 has a cylindrical fixed drum unit 30 fixedly arranged on the chassis 1; and a rotary drum unit 40 which is coaxial with the fixed drum unit and is rotatably supported thereto. Each of the rotary drum unit and the fixed drum unit is formed in a cylindrical shape having the same diameter.

A head tip is attached to the rotary drum unit so that a front edge portion faces the outer peripheral surface portion. The magnetic tape 308 is wound around the outer peripheral surfaces of the fixed drum unit and rotary drum unit. When the rotary drum unit is rotated, the head tip is come into slide contact with the magnetic tape 308, thereby transmitting and receiving the information signal to/from the magnetic tape 308.

The capstan 3 is rotatably arranged on the chassis 1. The capstan 3 is rotated at a constant speed by a capstan motor 9 arranged in the lower surface portion of the chassis 1.

The pinch roller 4 is rotatably attached onto the chassis 1. The pinch roller 4 is pressed against the capstan 3.

When the pinch roller 4 is away from the capstan 3, the pinch roller 4 is moved upward (direction in which it is away from the chassis 1) of the capstan 3.

The capstan 3 and pinch roller 4 construct a tape feeding mechanism for sandwiching the recording tape 308 which is stretched between the pair of tape reels 309S and 309T and feeding the recording tape 308 from the supply reel 309S toward the take-up reel 309T.

A pair of tape guides 19 and 22 and a pair of slant guides 20 and 21 are provided on the chassis 1.

When the tape cassette 301 is loaded onto the chassis 1, the tape guides 19 and 22 and slant guides 20 and 21 enter the concave portion 316 at the initial position and are positioned on the rear side of the magnetic tape 308.

When the tape guides 19 and 22 and slant guides 20 and 21 are moved by a mode switching motor 14, they are moved to positions serving as both sides of the rotary head unit 2, thereby pulling out the magnetic tape 308 from the tape cassette 301 to the front side and winding around the rotary head unit 2.

That is, the rotary head unit 2 reads out the information signal from the magnetic tape 308 locating between the supply reel 309S and the tape feeding mechanism comprising the capstan 3 and pinch roller 4.

After the magnetic tape 308 was pulled out from the tape cassette 301, the pinch roller 4 is moved downwardly (the direction in which the pinch roller approaches the chassis 1) and enters the rear side of the magnetic tape 308. Subsequently, the pinch roller 4 is pressed to the capstan 3 and sandwiches the magnetic tape 308 in cooperation with the capstan 3. In a state where the capstan 3 and pinch roller 4 sandwich the magnetic tape 308 as mentioned above, when the capstan 3 is rotated by the capstan motor 9, the capstan 3 and pinch roller 4 are rolled in contact with each other, thereby feeding the magnetic tape 308.

A rotatably supported swing arm 13 is provided between the reel bases 6 and 7. The swing arm 13 is rotated in the direction according to the rotational direction of a transfer gear 16 which is provided on the base end side of the swing arm 13 so as to be coaxial with the rotary shaft of the swing arm 13. A driving force of the capstan motor 9 is transferred to the transfer gear 16, so that the transfer gear 16 is rotated in the direction according to the operating mode. A swing gear 8 engaged with the transfer gear 16 is rotatably attached to the front edge side of the swing arm 13.

As shown by an arrow W, the swing gear 8 can be come into engagement with either one of a gear portion of the supply side reel base 6 and a gear portion of the take-up side reel base 7 by the rotation of the swing arm 13.

That is, in the recording and reproducing apparatus, the take-up side reel base 7 is rotated by the swing gear 8 in the direction in which the magnetic tape 308 is wound around the take-up reel 309T in an operating mode to feed the magnetic tape 308 in the positive direction. In the recording and reproducing apparatus, the supply side reel base 6 is rotated by the swing gear 8 in the direction in which the magnetic tape 308 is wound around the supply reel 309S in an operating mode to feed the magnetic tape 308 in the reverse direction.

A tension regulator mechanism for causing a tape tension to the magnetic tape 308 locating between the supply reel 309S and the tape feeding mechanism is provided on the chassis 1. The tension regulator comprises a tension regulator arm 5, a tension regulator roller 15, and a band brake 10.

The base end side of the tension regulator arm 5 is rotatably supported on the chassis 1 via a spindle (not shown) and the tension regulator roller 15 is rotatably attached to the front end side of the tension regulator arm 5. The tension regulator arm 5 is rotated by a driving force of the mode switching motor 14.

When the tape cassette 301 is loaded on the chassis 1, the tension regulator roller 15 enters the concave portion 316 at the initial position and is positioned on the rear side of the magnetic tape 308.

When the tension regulator roller 15 is moved to the outside of the cassette 301 by the mode switching motor 14, the magnetic tape 308 is pulled out from the tape cassette 301 to the front side.

A tension regulator spring 12 is suspended between the tension regulator arm 5 and the chassis 1. One end side of the tension regulator spring 12 is retained to a retaining member 11 on the chassis 1 and the other end is retained onto the tension regulator arm 5. The tension regulator roller 15 presses and rotates the tension regulator arm 5 in such a direction that the magnetic tape 308 is pulled out from the tape cassette 301.

The band brake 10 for braking the rotation of the supply side reel base 6 is connected to the tension regulator arm 5. One end of the band brake 10 is retained to a retaining unit 136 of the chassis 1 and the other end is retained to the tension regulator arm 5. A brake slide contacting unit 137 in the center portion is wound around the supply side reel base 6. When the tension regulator arm 5 is rotated in such a direction that the magnetic tape 308 is pulled out from the cassette 301 by the tension regulator roller 15, the band brake 10 enhances the braking force to the supply side reel base 6. When the magnetic tape 308 is fed in the position direction and the braking force by the reel brake 10 to the supply side reel base 6 is enhanced, the tension of the magnetic tape 308 is increased.

In the tension regulator, therefore, the supply side reel base 6 is braked by the band brake 10 so that the tensile force of the tension regulator spring 12 and the tension of the magnetic tape 308 are balanced.

In the recording and reproducing apparatus, the take-up side reel base 7 also has a tension regulator of a construction similar to that of the tension regulator of the supply side reel base 6.

A pair of fixed guides 17 and 24 are provided on the chassis 1. The fixed guides 17 and 24 are arranged at the positions on both sides of the concave portion 316 on the front side of the tape cassette 301 when the tape cassette 301 is loaded onto the chassis 1.

Figure 6:
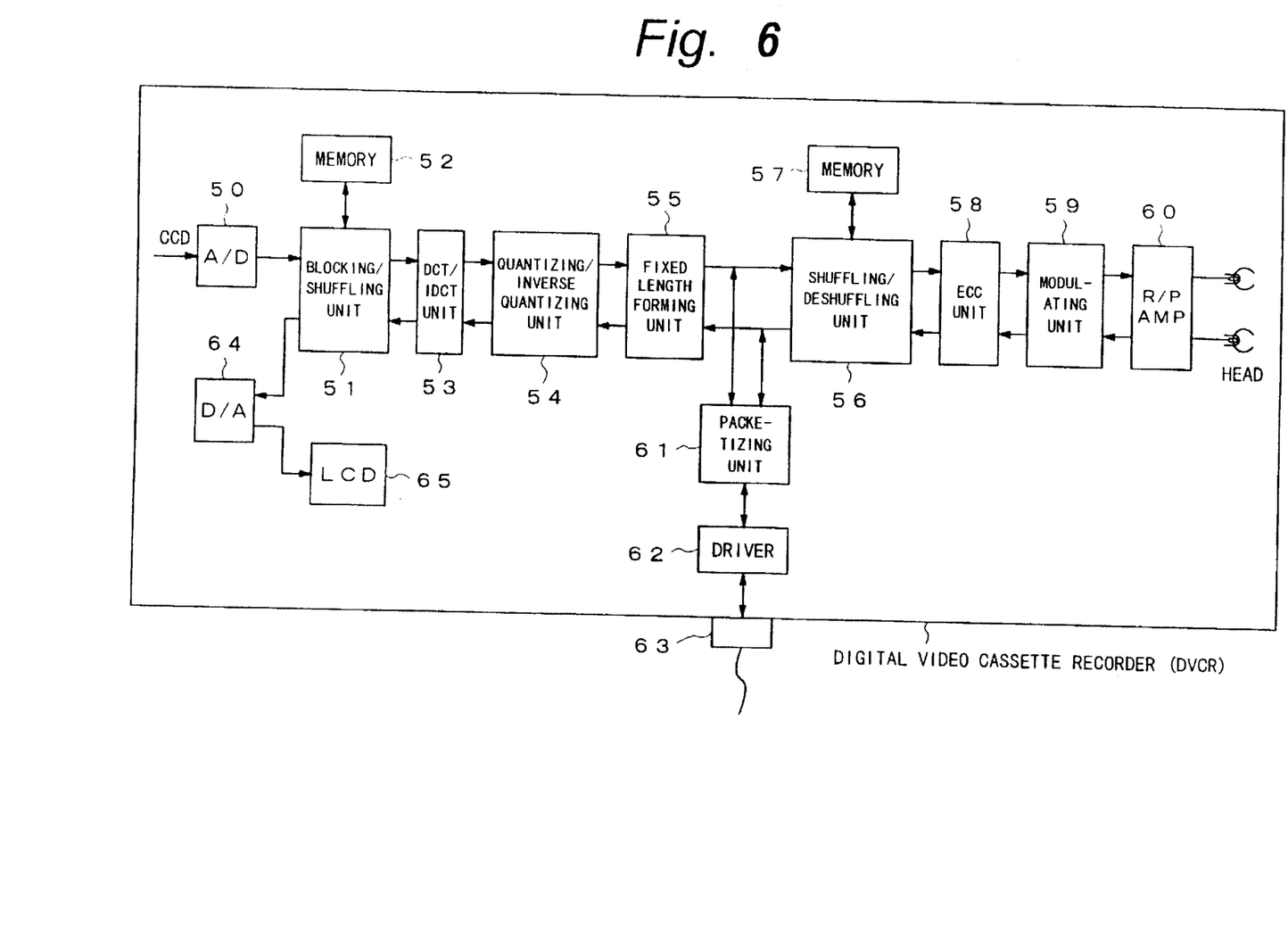
FIG. 6 is a block diagram of the recording and reproducing apparatus.

FIG. 6 is a block diagram showing an example of a further detailed construction of the recording and reproducing apparatus. A digital video cassette recorder (DVCR) comprises an A/D converter 50, a blocking/shuffling unit 51, a memory 52, a DCT/IDCT arithmetic operating unit 53, a quantizing/inverse quantizing unit 54, a fixed length forming unit 55, a shuffling/deshuffling unit 56, a memory 57, an ECC unit 58, a modulating unit 59, a recording/playback amplifying unit (R/P AMP) 60, a packetizing unit 61, a driver 62, a connector 63, a D/A converter 64, and an LCD 65.

A video signal (luminance signal, red color-difference signal, blue color-difference signal) generated from a CCD (not shown) is converted to digital data by the A/D converter 50. In this case, the ratio of a sampling frequency for the luminance signal of the A/D converter 50 and a sampling frequency for the red color-difference signal or blue color-difference signal is set to 4:1. The digital video signal (hereinlater, referred to as video data) generated from the A/D converter 50 is supplied to the blocking/shuffling unit 51 and a block forming process and a shuffling process are performed.

That is, in the block forming process in the blocking/shuffling unit 51, the video data (luminance data Y, red color-difference data $C_B$, blue color-difference data $C_B$) of each frame generated from the A/D converter 50 is divided into (8×8) blocks as a basic unit of a DCT (discrete cosine transform).

Figure 7:
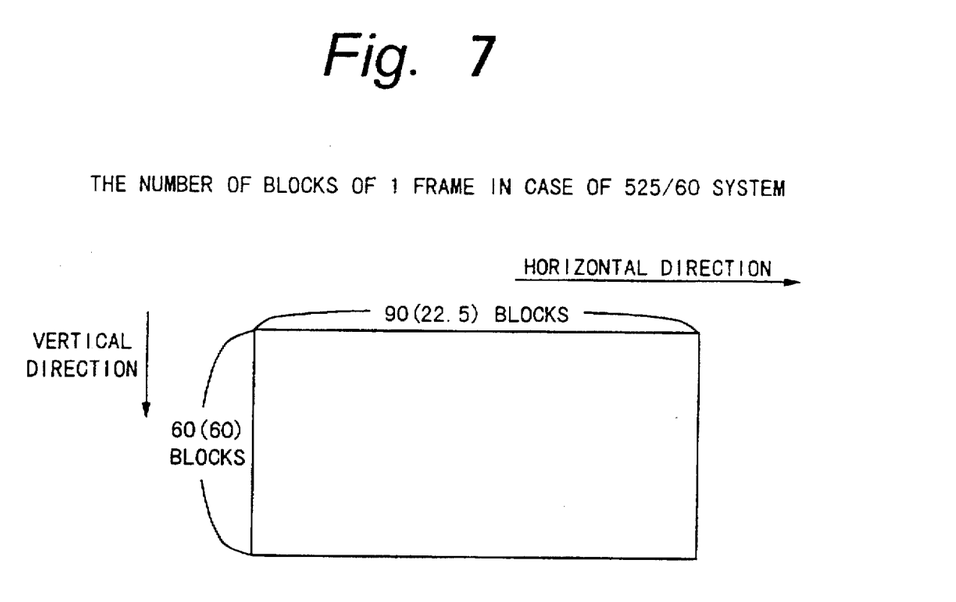
FIG. 7 is a schematic diagram for explaining block division.

In this case, since the sampling frequencies of the luminance signal and the color difference signals in the A/D converter 50 differ as mentioned above, four blocks of the luminance data Y and one block each of the color difference data $C_B$ and $C_B$ occupy the same positions (areas) on the screen. For example, in case of a 525/60 system, as shown in FIG. 7, 90 blocks of the luminance data Y and 22.5 blocks each of the color difference data $C_B$ and $C_B$ are arranged in the horizontal direction of one frame. 60 blocks of the luminance data Y and 60 blocks each of the color difference data $C_B$ and $C_B$ are arranged in the vertical direction (upper/lower direction of the diagram).

Figure 8A:
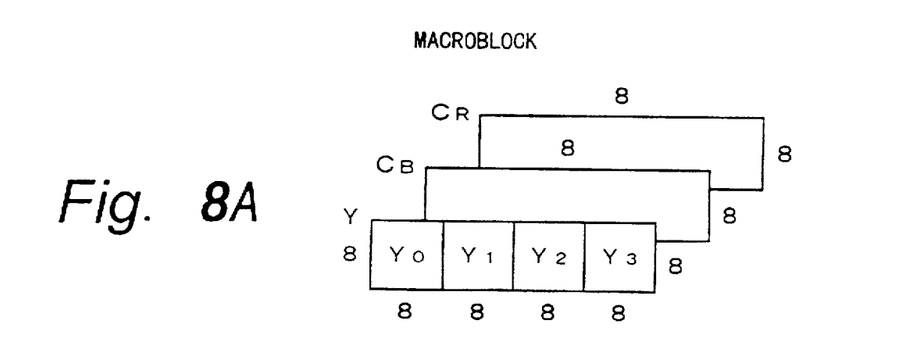
FIGS. 8A and 8B are schematic diagrams of macro block structure.
Figure 8B:
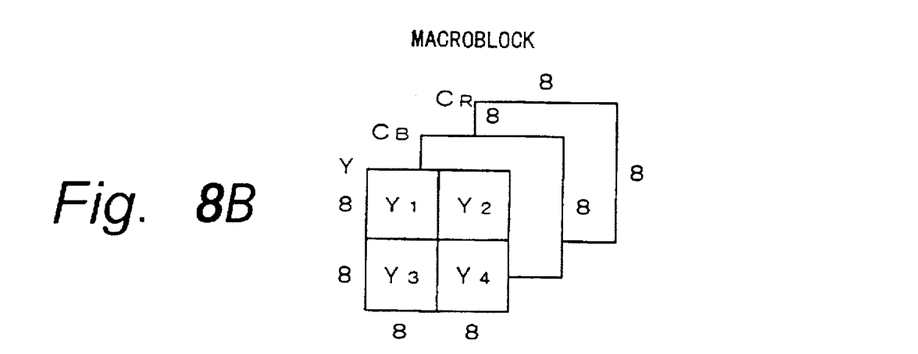

Total six blocks of four blocks ($Y_0$ to $Y_3$) of the luminance data Y and one block each of the color difference data $C_B$ and $C_B$ which are arranged at the same positions on the screen are used as one processing unit. The six blocks are called a macroblock (MB). FIGS. 8A and 8B show constructions of the macroblock in the 525/60 system. FIG. 8B shows a construction of the macroblock in the end portion of the screen where the number of blocks of each of the color difference data $C_B$ and $C_B$ is equal to 0.5. FIG. 8A shows a construction of the macroblock in the other portion.

In the shuffling process by the blocking/shuffling unit 51, five macroblocks as a unit of a fixed length forming process of compressed video data are collected from the image data of one frame stored in the memory 52 on the basis of a predetermined rule. By the process of collecting the five macroblocks on the basis of the predetermined rule, the image data subjected to the shuffling process is obtained.

The five macroblocks are called a buffering unit (BU). By executing the shuffling process as mentioned above, an information amount of buffing units are uniformed (averaged), so that a distortion due to the data compression can be uniformed in the screen.

For example, the shuffling process is executed as follows in the 525/60 system.

Figure 9:
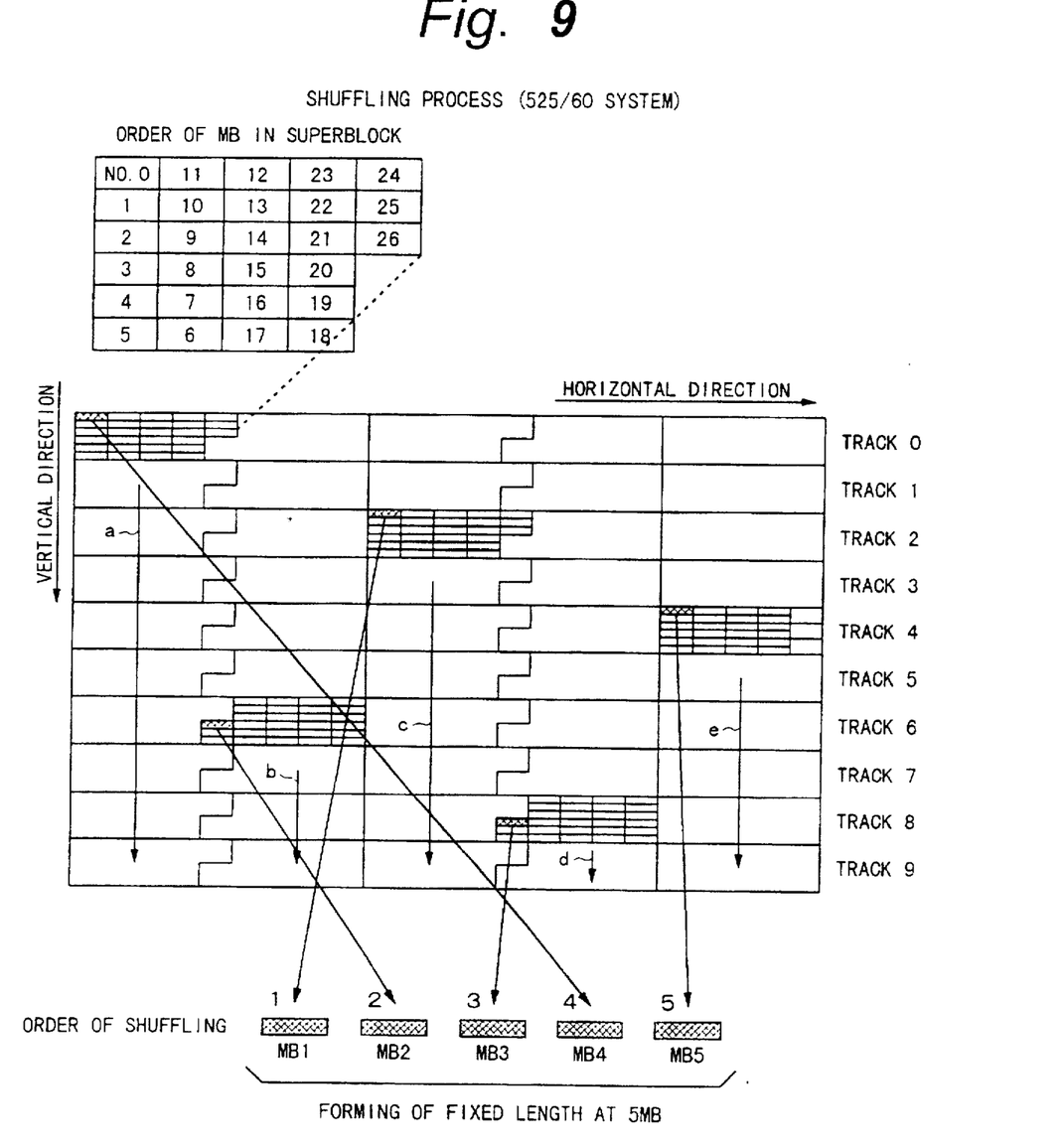
FIG. 9 is a schematic diagram for explaining a shuffling process.

As shown in FIG. 9, first, one picture plane is divided (into five) in the horizontal direction in accordance with the number of macroblocks in a video segment, which will be described hereinlater, and is divided (into 10) in the vertical direction in accordance with the number of tracks on a magnetic tape for recording data of one frame. One block obtained by the above dividing operation is called a super block. Each super block consists of 27 macroblocks.

The super blocks are selected one by one from each array in the vertical direction. Macroblocks (No. 0) included in the super blocks are first collected, thereby constructing a first video segment (MB1 to MB5). Macroblocks (No. 1) are collected from the same super blocks, thereby constructing a second video segment. By repeating similar processes, when the generation of all of the macroblocks in the five super blocks is finished, next five super blocks are processed. That is, the next super blocks are selected according to the order shown by arrows (a) to (e) shown in FIG. 9.

The video segment which has been subjected to the blocking/shuffling process and is generated from the blocking/shuffling unit 51 shown in FIG. 6 is supplied to the DCT/IDCT arithmetic operating unit 53. The DCT/IDCT arithmetic operating unit 53 executes both of a DCT arithmetic operating process and a variable length coding process to the received video segment. The quantizing/inverse quantizing unit 54 selects a quantization step such that the number of bits (coding amount) of the data after the variable length coding process is set to the largest number of bits within a range in which it doesn't exceed the number of bits (target bit number) given to the video segment and performs a quantizing operation. The quantizing/inverse quantizing unit 54 zigzag scans coefficients of each block after the quantizing process from DC component data on the basis of a modified 2-dimensional Huffman coding and allocates codes to a set of a runlength of the coefficient "0" and values of subsequent non-zero coefficients.

Data generated from the quantizing/inverse quantizing unit 54 is supplied to the fixed length forming unit 55. The fixed length forming unit 55 packs (fixed length forming) the data of each video segment to five sync blocks (SB, which will be described hereinlater).

Figure 10:
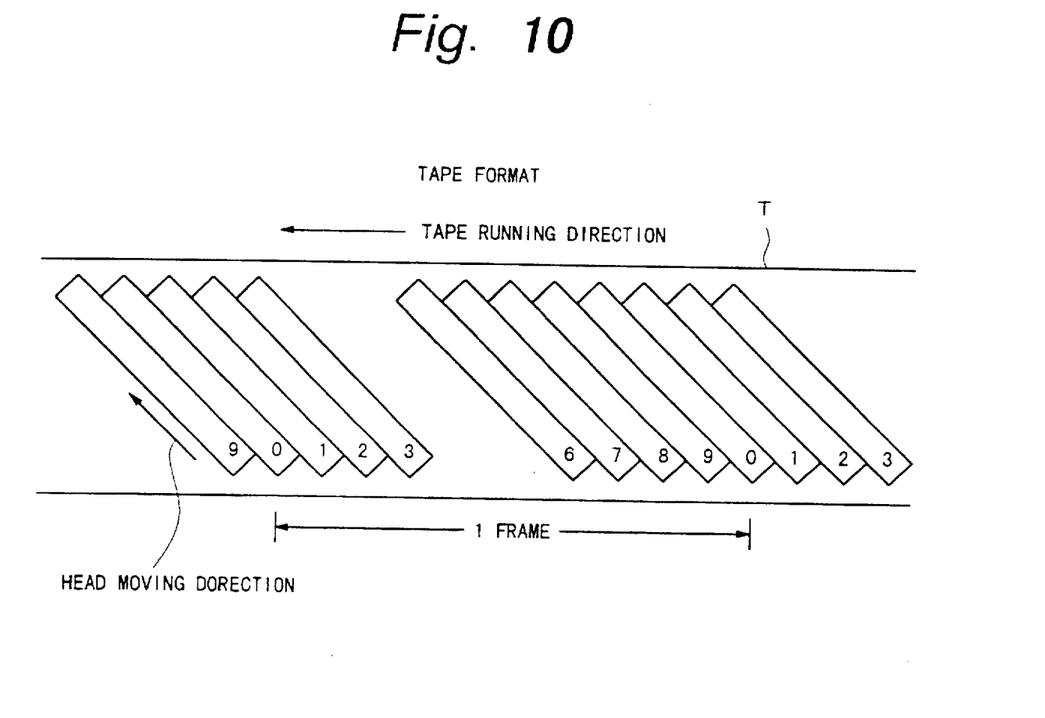
FIG. 10 is a schematic diagram showing a track pattern on the magnetic tape.

The sync block denotes a small area obtained by dividing a track on the magnetic tape. That is, a recording area of the video data of each track on the magnetic tape is divided into small areas called sync blocks. The number of sync blocks included in one track is equal to 135. As shown in FIG. 10, in the 525/60 system, since the video data of one frame is divided into 10 tracks (tracks 0 to 9) and is recorded as mentioned above, the number of sync blocks per frame is equal to 1350, which is equal to the number of macroblocks per frame.

Data generated from the fixed length forming unit 55 is supplied to the packetizing unit 61 and also to the shuffling/deshuffling unit 56. In the packetizing unit 61, a packetizing process is executed to the compressed video data (data corresponding to a portion from the second to 81th bytes of the sync block) regarding the recording and reproduction. The packetized data is supplied to the driver 62. The driver 62 converts the packetized data to serial data of a format according to the IEEE1394 standard and generates the serial data via the connector 63.

The shuffling/deshuffling unit 56 obtains the original image data by writing data (shuffled data) of each video segment packed into 5 sync blocks into the memory 57 in accordance with the same order as that shown in FIG. 9. The shuffling/deshuffling unit 56 reads out data of the sync blocks of each frame from the memory 57 in accordance with the order of recording to the tracks 0 to 9 and generates the read data to the ECC unit 58.

The data of the sync blocks generated from the shuffling/deshuffling unit 56 is supplied to the ECC unit 58 and is added with a parity for error correction. After that, the data is supplied to the modulating unit 59. The modulating unit 59 performs a digital modulating process to the received sync block data and supplies the resultant data to the recording/playback amplifying unit (R/P AMP) 60. The recording/playback amplifying unit 60 amplifies the input signal by a predetermined gain and, after that, supplies the resultant signal to rotary magnetic heads, thereby recording the signal to the magnetic tape.

Figure 2A:
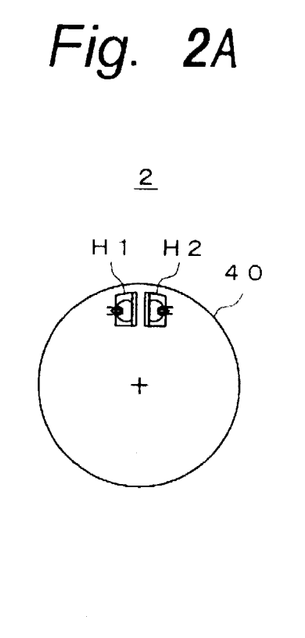
FIGS. 2A to 2C are schematic diagrams of an example of a rotary head apparatus to which the invention; can be applied.
Figure 2B:
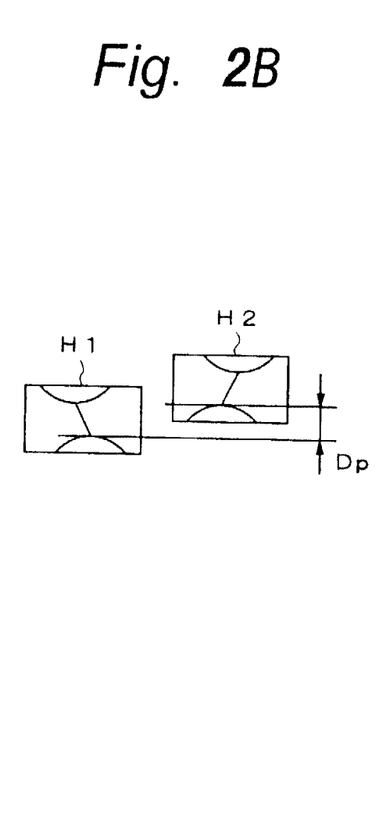
Figure 2C:
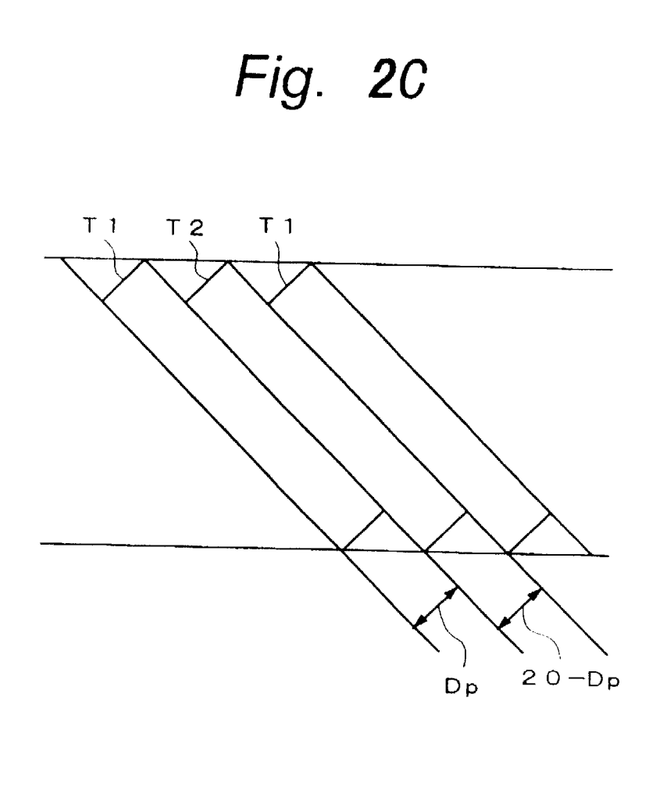
Figure 3A:
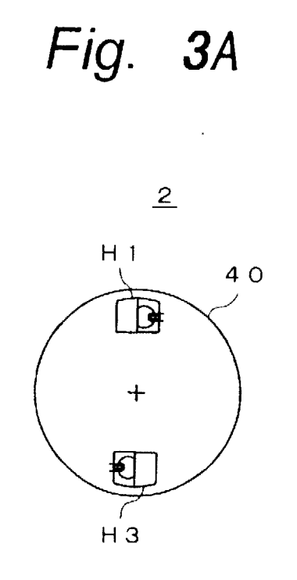
FIGS. 3A to 3C are schematic diagrams of another example of the rotary head apparatus to which the invention can be applied.
Figure 3B:
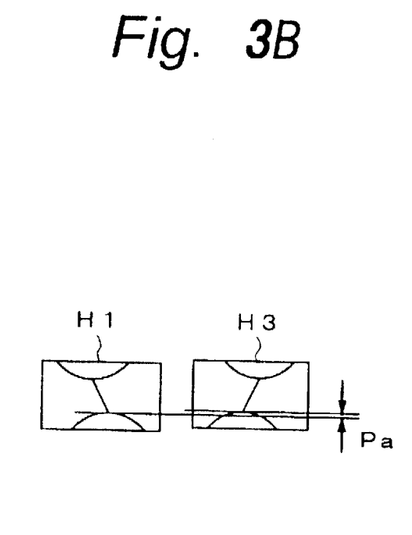
Figure 3C:
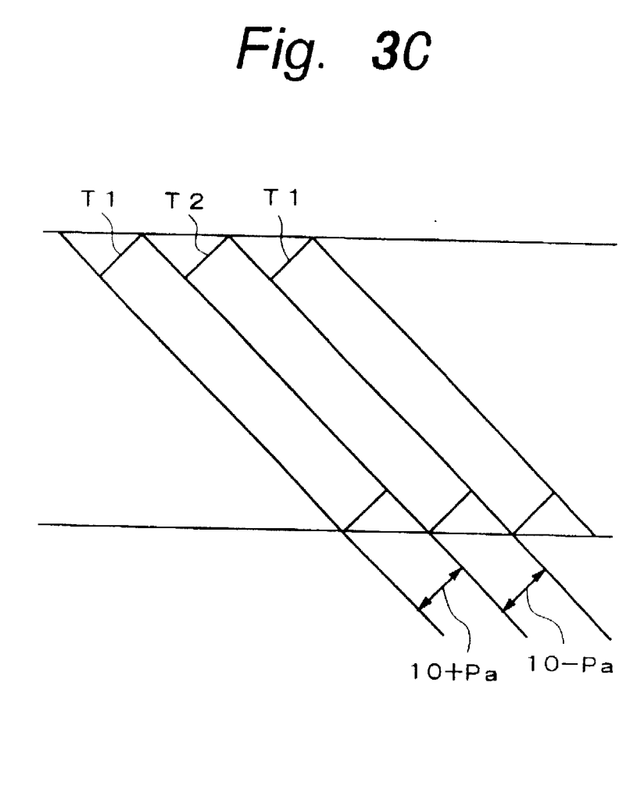

FIGS. 2A to 2C show examples of an arrangement of rotary head unit 2 to which the invention can be applied and FIGS. 3A to 3C show another example. As shown in FIG. 2A, a head H1 of an A channel and a head H2 of a B channel having different azimuth angles are provided at positions which are extremely close each other on a rotary drum unit 40. As mentioned above, when the invention is not applied, the performance of the A channel is inferior to the B channel from a relation between the azimuth angle and the orienting direction of the tape.

The two heads H1 and H2 are integratedly constructed so as to commonly use the component elements and are called a double azimuth head or a VX head. As shown in FIG. 2B, the heads H1 and H2 are closely provided with a height difference Dp on the rotary drum 1. In the example of FIGS. 2A to 2C, a magnetic tape is wrapped around the peripheral surface of the rotary drum 1 at a wrap angle of, for example, 174°. Digital recording signals are simultaneously supplied to the heads by a signal process for a period of time during which the heads H1 and H2 are in contact with the tape and two adjacent tracks T1 and T2 corresponding to the heads H1 and H2, respectively, are formed by one scan.

As shown in FIG. 2C, the track T1 has a track width corresponding to the height difference Dp between the two heads and the other track T2 corresponds to a value obtained by subtracting Dp from a distance (for example, 20 µm in a digital VCR for an industrial use) which is specified by a format and at which the tape moves during one rotation of the drum.

In another example of the rotary head unit 2, as shown in FIG. 3A, the head H1 of the A channel and a head H3 of the B channel are attached onto the rotary drum 40 so as to face each other at an angle of 180°. A height difference between the heads H1 and H3 when it is seen from the normal line direction of the axis of rotation of the drum is called a pairing and is expressed as Pa as shown in FIG. 3B. A magnetic tape is wrapped around the peripheral surface of the drum 40 at a wrap angle of, for example, 174°. Those heads H1 and H3 have different azimuth angles as shown in FIG. 3B and form two adjacent tracks T1 and T2 by alternately scanning the magnetic tape.

As for the widths of the two tracks, as shown in FIG. 3C, the track width of the track T1 corresponds to a value obtained by adding Pa to the half of the distance (for example, 20 µm in the digital VCR for an industrial use) which is specified by the format and at which the tape moves during one rotation of the drum and the track width of the other track T2, contrarily, corresponds to a value obtained by subtracting Pa from the half of the distance at which the tape moves during one rotation of the drum.

The invention can be also applied to each of the head arrangements of FIGS. 2A to 3C. In case of FIG. 1, since the heads H1 and H2 simultaneously scan the magnetic tape, even there is a peripheral vibration of the drum, an error amount of linearity of the track can be suppressed. Further, the invention can be also applied to a construction having three or more heads in order to enable a mode in which tape speeds are different.

In the invention, the track width of each of the two tracks T1 and T2 is set so as to reduce the unbalance of the performances between the two channels. By intentionally giving a difference between the track widths, which are usually set to be equal, of the tracks T1 and T2 formed by the heads H1 and H2 (or H3) of the A and B channels, the unbalance of the reproduction outputs, adjacent crosstalks, and adjacent erase amounts which occurs from the relation of the azimuth angle, track angle, and orienting direction of the tape is suppressed, so that the performances between the two channels can be almost equalized.

As an example, the digital VCR for an industrial use will be mentioned. In the digital VCR for an industrial use, the distance which is specified by the format and at which the tape moves during one rotation of the drum, is equal to 20 µm as mentioned above. When the track widths of the two tracks T1 and T2 are set to 10 µm, the performance of the A channel remarkably deteriorates due to the relations among the azimuth angles (±20°), the track angle (about 10°), and the orienting direction of the tape, so that the channels are unbalanced. In order to reduce the unbalance, the track width of the track T1 is set to a value larger than the track width of the track T2. For example, it is assumed that the track width of the track T1 is set to 11 µm and the track width of the track T2 is set to 9 µm. It is, for this purpose, sufficient to change Dp in the above-mentioned first head arrangement and Pa in the second head arrangement in consideration of tolerance upon manufacturing as follows.

| (conventional value) | (after change) |
|---|---|
| Dp: 10 ± 1 µm | → 11 ± 1 µm |
| Pa: 0 ± 1 µm | → 1 ± 1 µm |

The invention is not limited to the analog or digital VCR but can be also applied to a head apparatus which is used for a rotary head type apparatus of a data storage or the like.

According to the invention, the performances of the A and B channels can be almost equalized and the deterioration in performance as equipment, such as noises, flicker, error rate, or the like can be reduced. The invention is particularly effective to the rotary head apparatus in which the track angle and azimuth angle are large.

In order to suppress the unbalance of the performances between the channels, although a method of making the azimuth angles of the two heads different can be also used, this method has a drawback such that the manufacturing of the heads, management of the heads, and the like are complicated. The present invention has an advantage such that the unbalance between the channels can be corrected while the azimuth angles of the two heads are kept to be almost equal.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A head apparatus for recording and/or reproducing an information track to/from a magnetic tape having predetermined orientation characteristics, comprising:

a first magnetic head having a first azimuth angle for recording and/or reproducing information in and/or from a first plurality of tracks;

a second magnetic head having a second azimuth angle for recording and/or reproducing information in and/or from a second plurality of tracks having a width larger than that of said first plurality of tracks; and a rotating member for rotating said first and second magnetic heads.

2. A head apparatus according to claim 1, wherein said second azimuth angle is larger than said first azimuth angle with respect to an angle relative to the axis of the respective track.

3. A head apparatus according to claim 2, wherein said first azimuth angle and said second azimuth angle have opposite polarities and are almost equal.

4. A head apparatus according to claim 2, wherein said first and second magnetic heads are closely formed and an attaching height of said second magnetic head to said rotating member is set so as to form or reproduce the information track of a width larger than that of said first magnetic head.

5. A head apparatus according to claim 2, wherein said first and second magnetic heads are attached at facing positions and a paring of said second magnetic head is set so as to form or reproduce the information track of a width larger than that of said first magnetic head.

6. A recording and/or reproducing apparatus for recording and/or reproducing an information track to/from a magnetic tape having predetermined orientation characteristics, comprising:

means for feeding the tape at a predetermined speed;

a rotary head unit for recording and/or reproducing information to/from said feed tape, in which said rotary head unit has a first magnetic head having a first azimuth angle for recording and/or reproducing information in and/or from a first plurality of tracks, a second magnetic head having a second azimuth angle for recording and/or reproducing information in and/or from a second plurality of tracks having a width larger than that of said first plurality of tracks, and a rotating member for rotating said first and second magnetic heads, and a signal processing unit for transmitting and receiving the information signal to/from said rotary head unit.

7. An apparatus according to claim 6, wherein said second azimuth angle is larger than said first azimuth angle with respect to an angle for an orientation direction of the tape.

8. An apparatus according to claim 7, wherein said first azimuth angle and said second azimuth angle have opposite polarities and are almost equal.

9. An apparatus according to claim 8, wherein said first and second azimuth angles are set to ±20°, a track angle is set to 10°, and a track width of a signal which is formed or reproduced by said second magnetic head is set to about 1.1 times as large as that of said first magnetic head.

10. An apparatus according to claim 7, wherein said first and second magnetic heads are attached at facing positions and a pairing of said second magnetic head is set so as to form or reproduce the information track of a width larger than that of said first magnetic head.

11. An apparatus according to claim 7, wherein a video signal of one field is divided into a plurality of tracks and is recorded and/or reproduced.

12. An apparatus according to claim 7, wherein said first and second magnetic heads are closely formed and an attaching height of said second magnetic head to said rotating member is set so as to form or reproduce the information track of a width larger than that of said first magnetic head.

* * * * *